(12) United States Patent
Kummer et al.

(10) Patent No.: US 11,223,632 B2
(45) Date of Patent: Jan. 11, 2022

(54) METHOD AND APPARATUS FOR MANAGING DATA IN A CONTENT MANAGEMENT SYSTEM

(71) Applicant: CoreMedia GmbH, Hamburg (DE)

(72) Inventors: Olaf Kummer, Halstenbek (DE); Sören Stamer, Hamburg (DE)

(73) Assignee: CoreMedia GmbH, Hamburg (DE)

( * ) Notice: Subject to any disclaimer, the term of this patent is extended or adjusted under 35 U.S.C. 154(b) by 0 days.

(21) Appl. No.: 16/796,858

(22) Filed: Feb. 20, 2020

(65) Prior Publication Data
US 2020/0274884 A1 Aug. 27, 2020

(51) Int. Cl.
*G06F 15/16* (2006.01)
*H04L 29/06* (2006.01)
(Continued)

(52) U.S. Cl.
CPC .......... *H04L 63/123* (2013.01); *H04L 9/3297* (2013.01); *H04L 65/40* (2013.01); *H04L 67/1095* (2013.01); *H04L 67/42* (2013.01)

(58) Field of Classification Search
CPC ....... H04L 63/123; H04L 65/40; H04L 67/42; H04L 67/1095; H04L 9/3297; H04L 63/12; H04L 9/3273
(Continued)

(56) References Cited

U.S. PATENT DOCUMENTS 7,546,335 B2 * 6/2009 Moeller .................. H04L 67/42
  709/203
7,827,160 B2 * 11/2010 Kuhr .................... G06F 16/2455
  709/202
(Continued)

OTHER PUBLICATIONS

European Search Report and Search Opinion of the European Patent Office dated Jul. 9, 2019 for related European Patent Application No. 19158693.2.
(Continued)

*Primary Examiner* — Bharat Barot
(74) *Attorney, Agent, or Firm* — Womble Bond Dickinson (US) LLP

(57) ABSTRACT

The present disclosure relates to methods and apparatuses for data management in a system, in particular a content management system, comprising at least one server 101 and one or more clients 102a, 102b, 102c communicably connectable to the server, the server being configured to manage a plurality of mutable data objects and to enable the one or more clients to access data objects managed by the server. The management process includes executing, by the server, at least one of a plurality of data processing operations being respectively associated with a respective set of the plurality of data objects and outputting respective result data; receiving, by a client, first-type information indicative of the result data of the at least one data processing operation; storing, by the client, result data of the at least one data processing operation in a memory; receiving, by the first client, second-type information indicative of modification of at least one of the data objects; and determining, at the client and before using the result data of the at least one data processing operation stored in the memory, whether the respective result data is valid or not based on the first-type information and the second-type information.

24 Claims, 7 Drawing Sheets

(51) Int. Cl.
*H04L 9/32* (2006.01)
*H04L 29/08* (2006.01)

(58) Field of Classification Search
USPC ............... 709/202–203, 217–219, 227–228
See application file for complete search history.

(56) References Cited

U.S. PATENT DOCUMENTS

| | | | |
|---|---|---|---|
| 8,121,993 B2 * | 2/2012 | Blount | H04L 63/123 707/698 |
| 8,301,839 B2 | 10/2012 | Sundarrajan et al. | |
| 9,578,081 B2 | 2/2017 | Watte | |
| 2005/0192922 A1 * | 9/2005 | Edlund | G06F 16/24552 707/999.001 |
| 2007/0156966 A1 * | 7/2007 | Sundarrajan | G06F 12/0813 711/133 |
| 2014/0280522 A1 * | 9/2014 | Watte | H04L 67/42 709/203 |
| 2015/0215386 A1 * | 7/2015 | Walsky | H04L 67/42 709/203 |
| 2015/0248452 A1 | 9/2015 | Franke et al. | |
| 2015/0278242 A1 | 10/2015 | Grosman et al. | |
| 2016/0366151 A1 * | 12/2016 | Tamura | H04L 63/0807 |
| 2017/0357681 A1 | 12/2017 | Brown et al. | |
| 2018/0329900 A1 | 11/2018 | Spiegel | |
| 2020/0272751 A1 | 8/2020 | Kummer et al. | |

OTHER PUBLICATIONS

European Search Report and Search Opinion of the European Patent Office dated Jun. 13, 2019 for related European Patent Application No. 19158692.4.

* cited by examiner

METHOD AND APPARATUS FOR MANAGING DATA IN A CONTENT MANAGEMENT SYSTEM

FIELD

The present disclosure relates to a method of managing data in a data management system, such as e.g. a content management system, and a related apparatus for managing a data management system, such as e.g. a content management system. The present disclosure further relates to a data management system, such as e.g. a content management system, in particular a web content management system, and a related computer program product. In exemplary aspects, the present disclosure relates to management of cache data in a client-server architecture of a data management system, such as e.g. a content management system.

BACKGROUND

A content management system (CMS) manages the creation and modification of digital content. It typically supports multiple users in a collaborative environment. CMS features may vary widely. Most CMSs do include one or more of Web-based publishing, format management, history editing and version control, indexing, search, and retrieval. Typically, content management systems support the separation of content and presentation.

A web content management system (WCM or WCMS) is a CMS designed to support the management of the content of Web pages. Most popular CMSs are also WCMSs. Web content includes text and embedded graphics, photos, video, audio, maps, and program code (e.g., for applications) that displays content or interacts with the user.

More particularly, a web content management system (WCMS) is a software content management system (CMS) specifically for web content. It typically provides website authoring, collaboration, and administration tools that help users with little knowledge of web programming languages or markup languages create and manage website content. A WCMS may provide the foundation for collaboration, providing users the ability to manage documents and output for multiple author editing and participation. Most systems use a content repository or a database to store page content, metadata, and other information assets the system needs.

Most content management systems use server side caching to improve performance. This works best when the CMS or WCMS is not changed often but visits happen regularly. Administration is also typically done through browser-based interfaces e.g. on browser applications running on clients of a client server-structure in communication with one or more servers, but some systems require the use of a fat client. Clients may also use local caching to improve performance.

Content management systems (CMS) typically have, amongst others, two major components: (1) a content management application (CMA) is the front-end user interface that allows a user, even with limited expertise, to add, modify, and remove content from a website without the intervention of a webmaster; and (2) a content delivery application (CDA) compiles that information and updates the website. In addition, content management systems may have further components, e.g. for automated imports, backup, and/or cleanup.

Digital asset management systems are another type of CMS. They manage content with clearly defined author or ownership, such as documents, movies, pictures, phone numbers, and scientific data. Companies also use CMSs to store, control, revise, and publish documentation.

Regarding caching of content or settings within a CMS, e.g. at one or more servers and/or at one or more clients there may arise the challenge to handle invalidation of cache data (typically referred to as cache values) when the related content is changed in some way, and to further handle so-called dependencies of documents. Such document dependencies may occur in validation calculations of documents involving other documents or objects, e.g. when objects in a document may reference content or depend in some way on other documents or other objects.

In view of the above, it is an object of the present invention to provide an improved method of managing a data management system, such as e.g. a content management system, in particular to provide improved handling of document validation and/or cache value invalidation and/or related document/object dependencies.

SUMMARY

In accordance with the invention and exemplary aspects thereof, there is proposed a method for data management in a system, in particular a content management system, according to claim 1. Furthermore, exemplarily, there are proposed corresponding apparatuses, systems and computer-program products according to the other independent claims. Dependent claims relate to preferred exemplary aspects and embodiments.

In accordance with exemplary aspects there may be provided a method for data management in a system, in particular a content management system, preferably comprising at least one server and one or more clients communicably connectable to the server, the server being preferably configured to manage a plurality of mutable data objects (e.g. content objects) and/or to enable the one or more clients to access data objects managed by the server.

The method(s) may be provided as a process executed in the system including steps on the server and steps on the one or more clients, and the method(s) may be provided as interrelated methods being respectively provided on the server and on the client(s).

For example, there may be provided a method or interrelated methods for data management in a system, in particular a content management system, comprising at least one server and one or more clients communicably connectable to the server, the server being configured to manage a plurality of mutable data objects and to enable the one or more clients to access data objects managed by the server.

The method or a first independent method of interrelated methods may comprise: receiving, by a first client of the one or more clients, first-type information indicative of result data of at least one data processing operation, in particular validation computation and/or index computation, and a respective associated set of data objects; storing, by the first client, result data of the at least one data processing operation in a memory; receiving, by the first client, second-type information indicative of modification of at least one of the data objects; and determining, at the first client and before using the result data of the at least one data processing operation stored in the memory, whether the respective result data is valid or not based on the first-type information and the second-type information.

The method or a second independent method of interrelated methods may comprise: executing, by the server, at least one of a plurality of data processing operations, in particular validation computations and/or index computations, each data processing operation being associated with a respective set of the plurality of data objects and each data processing operation outputs respective result data indicative of a status of the respective set of data objects or a data object thereof; transmitting, by the server to a first client of the one or more clients, first-type information indicative of result data of at least one data processing operation, in particular validation computation and/or index computation, and a respective associated set of data objects; and transmitting, by the server to the first client or to all of the one or more clients, second-type information indicative of modification of at least one of the data objects.

In some exemplary aspects the method may preferably comprise: executing, e.g. by the server, at least one of a plurality of data processing operations, in particular validation computations and/or index computations, such as e.g. pre-determined data processing operations and/or pre-determined validation computations and/or index computations.

Such operations or computations may be pre-set, custom-programmed and/or be dynamically generated based on pre-set algorithms, and such pre-determined data processing operations and/or pre-determined validation computations and/or index computations may depend on one or more variable input parameters and/or on one or more documents, content objects, and/or metadata relating to one or more content objects/documents and optionally further depending on local or global settings for the content management system.

Preferably, each data processing operation may be associated with a respective set of the plurality of data objects (this kind of association may be referred to as "dependency") and/or each data processing operation may preferably output respective result data (such as a cache value or validation parameter value) indicative of a status of the respective set of data objects and/or a data object thereof.

Specifically, in some exemplary aspects, a data processing operation may compute one or more output values, wherein the output value(s) and/or the computation thereof may depend on one or more data objects and/or a status thereof. For example, a data processing operation may be applied to a certain data object, but potentially due to references to other objects from the certain data object (or references from referenced objects to further objects, the data processing operation may involve not only the certain data object or a status thereof, but it may further involve other objects as well, e.g. referenced objects and/or further objects referenced from referenced objects, etc. The set of objects involved in computations of the data processing operation can be considered to be associated with the data processing operation. In other words, the computation(s) of the respective data processing operation may depend on the objects of the associated set of objects and/or a status thereof.

In some exemplary embodiments, the members of a set of data objects associated with the data processing operation may change over time, e.g. due to user's modifications that may change references, add references, remove references, etc. Typically, it may be determined based on the execution of the data processing operation, e.g. during or after executing the data processing operation, what are the current members of the set of objects currently associated with the data processing operation. This may change over time, so that dependencies of a data processing operation may change over time. However, aspects of the invention have the benefit that dependencies are tracked ("dependency tracking").

In some exemplary aspects the method may preferably comprise: receiving, by a first client of the one or more clients, first-type information indicative of the result data of the at least one data processing operation and/or the respective associated set of data objects.

In some exemplary aspects the method may preferably comprise: storing, by the first client, result data of the at least one data processing operation in a memory.

In some exemplary aspects the method may preferably comprise: receiving, by the first client, second-type information indicative of modification of at least one of the data objects.

In some exemplary aspects the method may preferably comprise: determining, at the first client and before using the result data of the at least one data processing operation stored in the memory, whether the respective result data is valid or not based on the first-type information and the second-type information.

In some exemplary aspects, determining whether the respective result data is valid may preferably include determining whether the second-type information indicates that at least one of the data objects included in the set of data objects associated with the respective data processing operation as indicated in the first-type information was modified.

In some exemplary aspects the method may preferably comprise: requesting, by the first client, the server to re-execute at least one data processing operation, for example, if the associated result data stored in the memory is determined to not be valid.

In some exemplary aspects the method may preferably comprise: receiving, by the first client, first-type information indicative of updated result data of the at least one re-executed data processing operation and/or updated information on the respective associated set of data objects.

In some exemplary aspects the method may preferably comprise: determining, by the first client, whether the updated result data is valid or not based on a determination whether second-type information, which for example was received since the request to re-execute the at least one data processing operation, indicates that at least one of the data objects included in the set of data objects associated with the respective data processing operation was modified.

In some exemplary aspects, at least one of the sets of data objects may include a single data object, and/or at least one of the sets of data objects includes plural data objects, in particular wherein plural objects are related to one or more documents.

In some exemplary aspects the method may preferably comprise: receiving, by the first client from the server, second-type information as a stream (e.g. a broadcasted data stream) of events of objects modifications in the system.

In some exemplary aspects, executing, by the server, the at least one of the data processing operations may include determining, by the server, upon, in particular while, executing the respective data processing operation, the data objects being used as input information for executing the respective data processing operation.

In some exemplary aspects, executing, by the server, the at least one of the data processing operations may include generating, by the server, the first-type information indicative of the result data of the respective data processing operation and the respective associated set of data objects including the data objects being used as input information for executing the respective data processing operation.

In some exemplary aspects, executing, by the server, the at least one of a plurality of data processing operations may comprise determining, e.g. for one, some or each of the at least one of a plurality of data processing operations, a graphical representation to be displayed by the first client, the graphical representation being preferably indicative of the current state of one or more data objects.

In some exemplary aspects, executing, by the server, the at least one of a plurality of data processing operations may comprise determining, for one, some or each of the at least one of a plurality of data processing operations, whether the respective set of data objects complies with one or more criteria.

In some exemplary aspects, the status of the respective set of data objects indicated in the respective result data may be indicative of whether the respective set of data objects complies with the respective one or more criteria.

In some exemplary aspects, respective result data of at least one of the data processing operations may be different for different clients requesting the execution of the respective data processing operation.

In some exemplary aspects, respective result data of at least one of the data processing operations may be independent on which client requested the execution of the respective data processing operation.

In some exemplary aspects the method may preferably comprise determining, by the server, upon a request for second-type information, time information that comprises time stamps, digital timestamps, clock time and/or logical timestamps identifying the state of the plurality of data objects.

In some exemplary aspects the method may preferably comprise requesting, by the first client, additional second-type information based on time information received with second-type received e.g. during another request, in particular another earlier and/or independent request, and determining, by the server, second-type information comprising the set of data object modifications since said other request.

According to further exemplary aspects, there may be provided an apparatus being configured to execute a method according to at least one of the above aspects.

According to further exemplary aspects, there may be provided a system comprising at least one server and one or more clients communicably connectable to the server; the system (e.g. the server) being configured to execute a method according to at least one of the above aspects.

According to further exemplary aspects, there may be provided a system comprising at least one server and one or more clients communicably connectable to the server.

Preferably, the server is preferably configured to manage a plurality of data objects and/or to enable the one or more clients to modify data objects managed by the server, and/or the server is preferably configured to execute at least one of a plurality of data processing operations, each data processing operation being preferably and optionally associated with a respective set of the plurality of data objects and/or each data processing operation preferably outputs respective result data indicative of a status of the respective set of data objects.

Preferably, one client, some clients or each client of the one or more clients is configured to: receive first-type information indicative of the result data of the at least one data processing operation and the respective associated set of data objects, and a second-type information indicative of modification of at least one of the data objects by one of the one or more clients, to store result data of the at least one data processing operation in a memory of the respective client, and to determine before using the result data of the at least one data processing operation stored in the memory, whether the respective result data is valid or not based on the first-type and second-type information.

According to further exemplary aspects, there may be provided a computer program product for one or more clients communicably connectable to a server, the computer program product comprising a computer usable medium having computer readable program code embodied therein, said computer readable program code adapted to be executed to implement a method of any of the above exemplary aspects.

DETAILED DESCRIPTION

Figure 1:
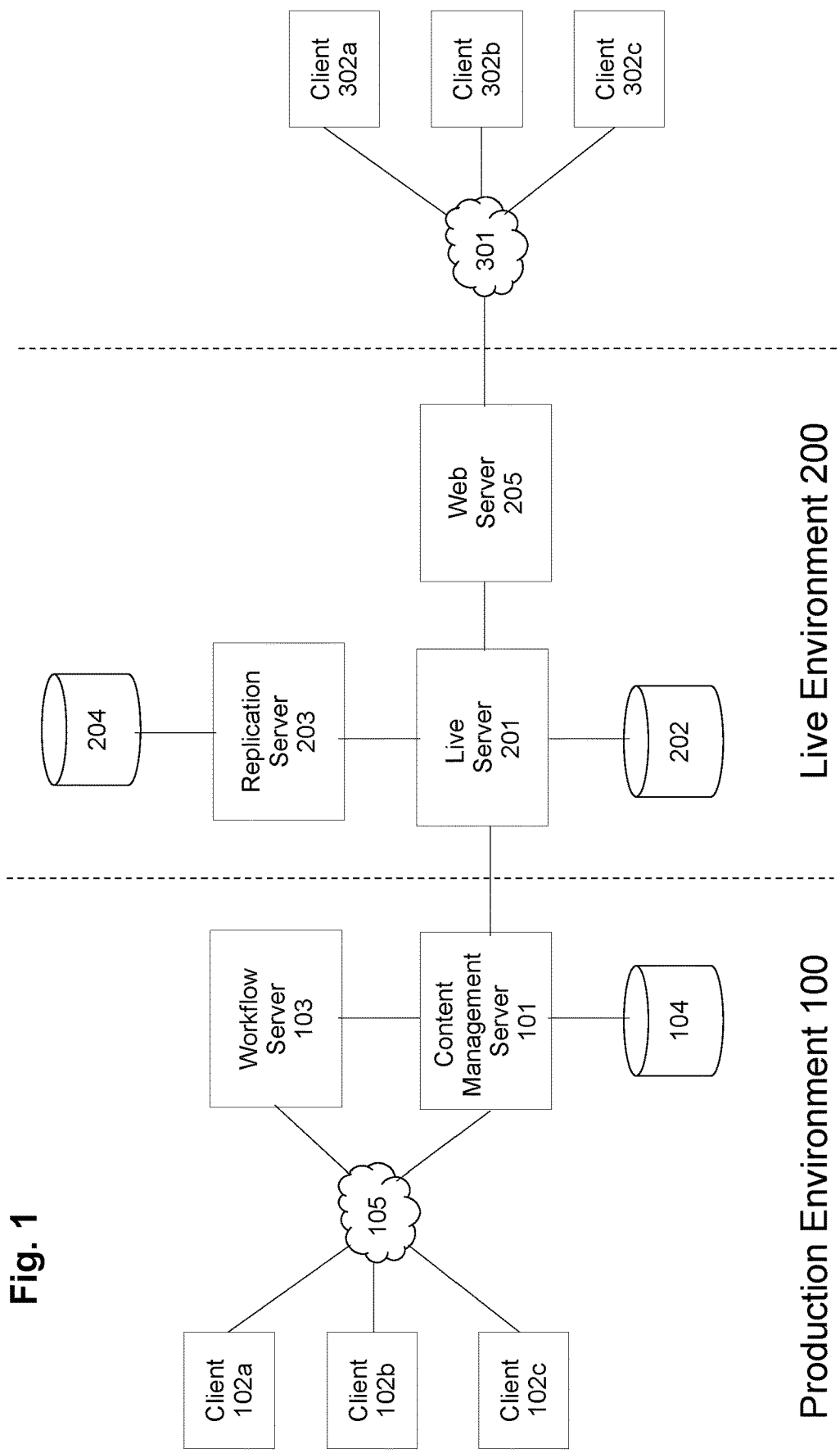
FIG. 1 is an exemplary schematic view of a content management system in accordance with some exemplary embodiments.

In the following, preferred aspects and exemplary embodiments of the present invention will be described in more detail with reference to the accompanying figures. Same or similar features in different drawings and exemplary embodiments may be referred to by same or similar reference numerals. It is to be understood that the detailed description below relating to various preferred aspects and preferred exemplary embodiments are not to be construed in any way as limiting the scope of the present invention.

FIG. 1 is an exemplary schematic view of a content management system in accordance with some exemplary embodiments.

The system includes a content management server 101 which manages content within an exemplary production environment 100 of the content management system, based on data content (and optionally metadata) that is contained in a data repository such as storage 104, which may be realized as a data repository and/or database, including exemplary storage solutions such as one or more disk drives, flash drives, disk arrays, storage systems such as scalable storage clusters including plural storage nodes e.g. for distributed storage, file system servers, block storage devices, object storage management systems, and other type of data storage, or any combination thereof.

The content management server 101 is exemplarily connected communicably to plural client computers 102a, 102b and 102c, exemplarily via a network 105. The network may be any type of communication network, such as e.g. an intranet, the internet, a LAN, or other networks, including wireless networks such as WLAN or others. Some exemplary embodiments include a client-server architecture, referring e.g. to a server application on the content management server 101 and respective client applications on the clients 102a to 102c. It is to be noted that the system of FIG. 1 is only a specific example which includes one content management server 101, but other exemplary embodiments may include also plural content management servers and/or a content management server system.

Exemplarily, the production environment 100 of the content management system in FIG. 1 includes an optional workflow server 103 providing workflow services to editing applications operating on the clients 102a to 102c for supporting users (authors) to edit content on content editing applications on the clients 102a to 102c. Such workflow services may include providing predefined workflow sequences for content creation, e.g. for website layout purposes or content creation sequences. In some exemplary embodiments, the workflow server 103 or another further server may provide templates such as website templates, document templates, and other object's templates.

Figure 2:
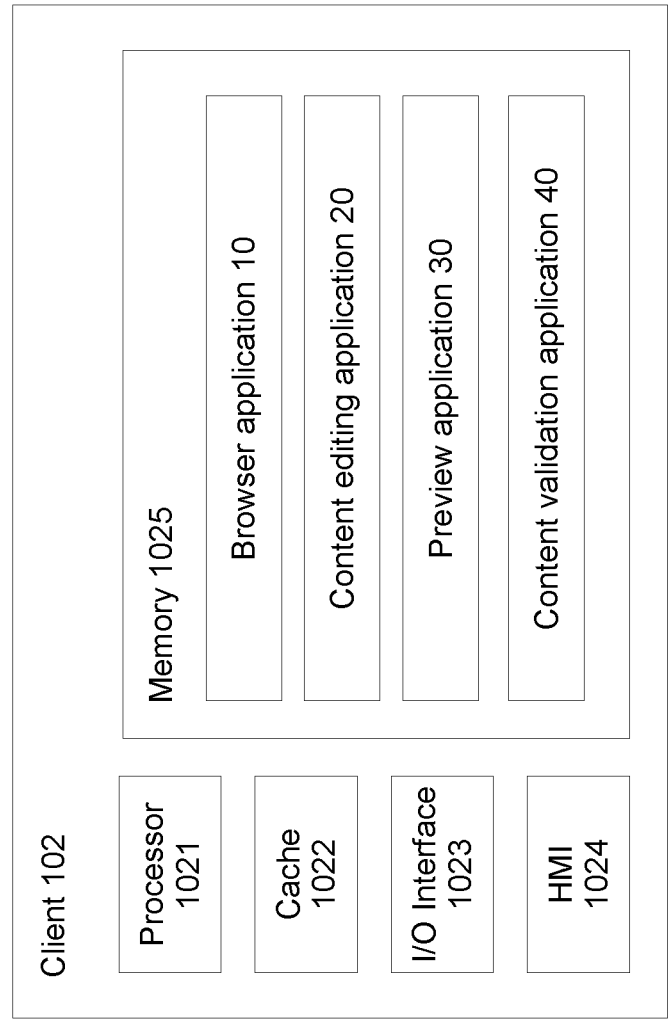
FIG. 2 is an exemplary schematic view of a client computer 102 in accordance with some exemplary embodiments.

FIG. 2 is an exemplary schematic view of a client computer 102 (such as any of clients 102a to 102c in FIG. 1) in accordance with some exemplary embodiments.

The client computer 102 exemplarily includes a processor 1021 for data processing, a cache memory 1022 for temporarily storing cache values (such as data content, including text, images, video, metadata, settings values, strings, numbers, flags, validation results, etc.), an I/O interface (e.g. network interface) 1023 for connection to the content server(s) 101, e.g. via a network such as network 105 in FIG. 1, and an HMI (Human-Machine-Interface) 1024 for user input/output, including any one of a display or touch-display, a keyboard, a mouse, a touch pad, a trackball, a headset, a microphone, a speaker, etc.

The client computer 102 further exemplarily includes a memory 1025 (including any of a ROM, RAM, NVRAM, disk drive(s), flash drive(s), or other type of accessible storage, etc.) for storing application data for applications to be executed by processor 1021 and/or by other applications being executed by processor 1021. Exemplarily, the applications on the client 102 may include a browser application 10, a content editing application 20, a preview application 30, and a content validation application 40.

The content editing application 20, preview application 30 and/or content validation application 40 may be provided separately, preferably interacting with each other, or they may be implemented within one software application as software application modules, or the like. In some exemplary embodiments, any one or more of the content editing application 20, preview application 30 and/or content validation application 40 may be browser-based applications running/executable partially or as a whole within the browser application 10, e.g. based on or including JavaScript applications, or other type of browser-based and/or browser implemented applets.

Exemplarily, the content editing application 20 provides an editing function to the users (authors) for creating, editing, arranging, rearranging, modifying, saving, and/or deleting content or content portions.

Content may generally refer to mutable content objects in the CMS, which may additionally be attributed with values, e.g. for validation purposes, and content may further refer also to such attributed values. For example, content may refer to e.g. articles or parts of articles, such as text, e.g. as article text body, or article abstract, or title, images, videos, client-side code and/or applications (e.g. in JavaScript or other languages) advertisement objects, and/or also links or references to other content. Content may further refer to any type of document object, such as articles, article summaries (such as for main page webpages listing multiple article summaries, including any combination of one or more of title, abstract, image, author name(s), etc.), lists of articles, webpages, websites, advertisements, etc. Content may further refer to formatting data that is used when rendering the webpage (or other objects or data) that is, e.g., shown to a website visitor (or whoever eventually may receive rendered content from the CMS), for example, CSS styles, HTML templates, image scaling and transformation rules, rules for generating a personalized presentation based on the identity of the website visitor.

Further exemplarily, the preview application 30 may provide a rendered preview of content created and/or edited with the content editing application 20. For example, if a user has arranged or edited a website page or portion on a webpage (such as an article or article summary on a webpage), the preview application 30 may render one or more affected webpages to allow the user to preview the edited content on the browser. For example, if a user/author has edited an abstract of an article within the content editing application 20, the user may preview the corresponding webpage having the article with the preview application 30 on the browser of the browser application 10. This may include the title, abstract, article body, advertisements, links and references to other articles on the webpage. The user may also preview a main webpage having an article summary including the edited abstract, etc.

For rendering content with the preview application 30 or also for loading content to the content editing application 20, the client 102 may obtain the respective content from the content management server 101 or from cache 1022, when available.

Returning to FIG. 1, it is to be noted that it may be possible in some exemplary embodiments that multiple users/authors on the different clients 102a to 102c may access and/or edit content at the same time, e.g. by accessing or editing same content on the content server 101, and different users may even edit similar content (e.g. related content) or same content in parallel.

In some exemplary embodiments, however optionally, when content is finalized as a publishable version and cleared for publication on the content server 102 in the production environment 100, the respective cleared content may be copied to the live server 201 in the live environment 200 of the system of FIG. 1. The content server 102 and the live server 201 may be connected directly or via a network, and the content server 102 and the live server 201 may be separated by a firewall in some preferred exemplary embodiments. In other exemplary embodiments, the published content may reside on the same server, e.g. on content server 102.

The content on the live server 201 only includes publishable versions of content, such as webpages, webpage portions, such as articles, images, advertisements, videos, etc. finalized for publication. Other content, which is still under working progress or newer versions being edited, is only kept on the content server 101 for editing and preview from clients 102.

The live server 201 is exemplarily communicably connected to a data repository 202, and the live server 201 manages (published) content within the exemplary live environment 200 of the content management system, based on (published) data content (and optionally metadata) that is contained in the data repository such as storage 202, which may be realized as a data repository and/or database, including exemplary storage solutions such as one or more disk drives, flash drives, disk arrays, storage systems such as scalable storage clusters including plural storage nodes e.g. for distributed storage, file system servers, block storage devices, object storage management systems, and other type of data storage, or any combination thereof.

For data replication purposes, the live environment 200 of the content management system exemplarily further includes a replication server 203 managing the mirror copy (replicated content) as managed by the live server 201.

The replication server 203 is exemplarily communicably connected to another data repository 204, and the replication server 203 manages (replicated) content within the exemplary live environment 200 of the content management system, based on (replicated) data content (and optionally metadata) that is contained in the data repository such as storage 204, which may also be realized as a data repository and/or database, including exemplary storage solutions such as one or more disk drives, flash drives, disk arrays, storage systems such as scalable storage clusters including plural storage nodes e.g. for distributed storage, file system servers, block storage devices, object storage management systems, and other type of data storage, or any combination thereof.

The live server 201 is further exemplarily communicably connected to a web server 205 which obtains content from the live server 201 on client's requests and provides the requested content as web content, e.g. rendered or renderable within browser applications on connected clients 302 (which may be any type of computer, laptop, tablet, mobile device such as mobile phone, smartphone, or the like).

Exemplarily, client computers 302*a*, 302*b*, and 302*c* are connected via a network 301 to web server 205. The network 301 may be any type of network, similar to network 105, but most preferably it is an intranet or the internet. For example, if the content managed on the content server 101 is a website including many related webpages, such on a news website or open corporate website, the users of clients 302*a* to 302*c* may be public internet users.

Figure 3:
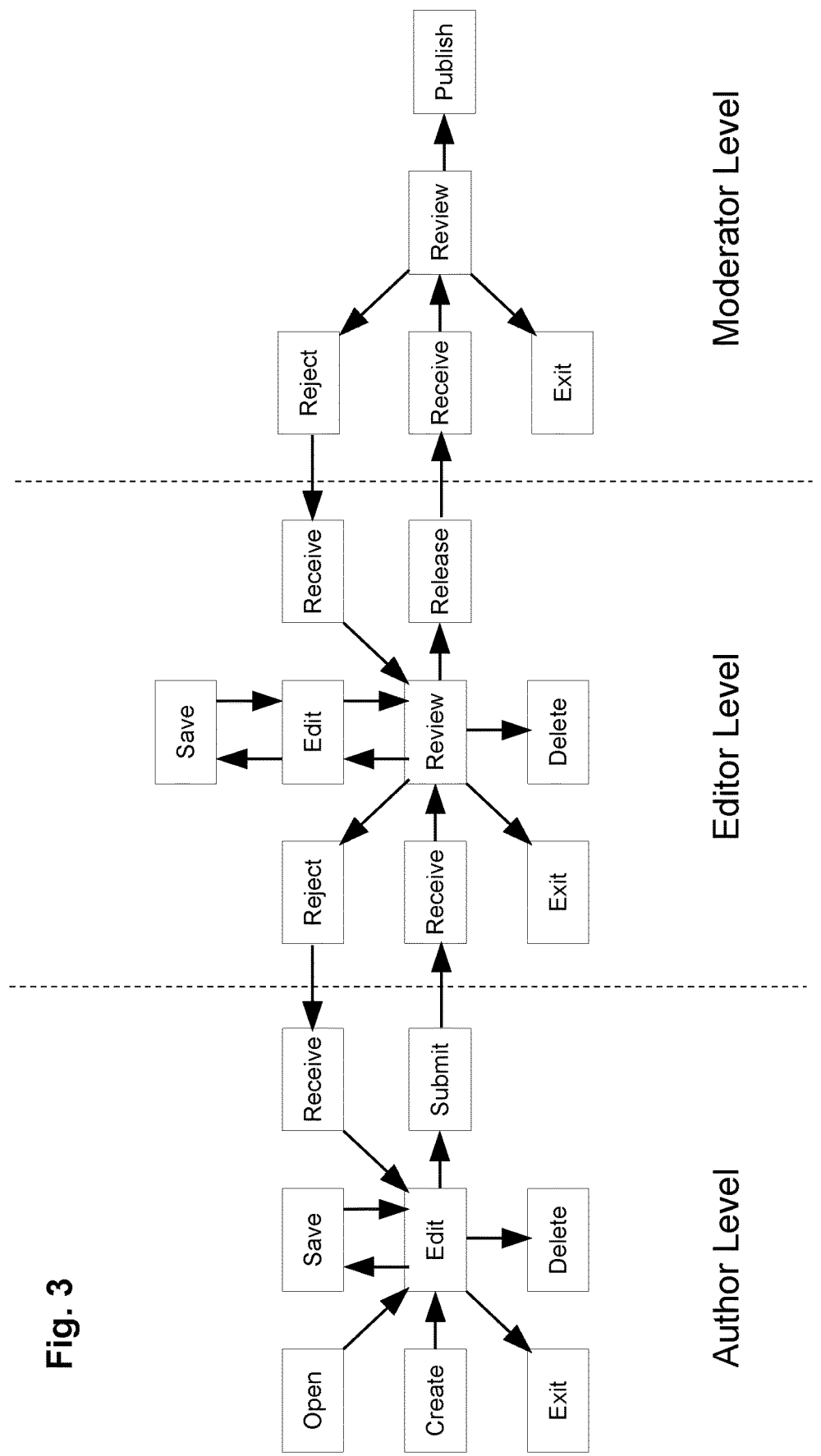
FIG. 3 exemplarily illustrates optional available operations of content management system users accessing content server 101 via clients 102.

FIG. 3 exemplarily illustrates optional available operations of content management system users accessing content server 101 via clients 102. For example, different users can have different roles e.g. with different access rights.

On an exemplary author level, regular authoring users may access content via an editing application 20 based on author access rights. Such access operations may include creating content, editing created content and saving the edited and/or created content, or deleting (created or edited) content. Deleting operations may be restricted to their own created or edited content in cache 1022 on their own client 102, not being allowed to delete content on the content server 101, in some exemplary embodiments. Saving created or edited content may also be restricted to local storage on the respective client 102 in some exemplary embodiments.

When content is created, edited and/or (e.g. locally) saved, the author/user may also have an option to submit the respective created and/or edited content, e.g. as a new content version, such as a proposal for publication.

For example, in some exemplary embodiments, an editor (another user role) may then review the submitted content or submitted new content version, and if acceptable for publication, the editor may release the content for publication or reject the content's publication otherwise. That is one or two user roles may be provided, but more than two user roles may be provided in further exemplary embodiments.

That is, in FIG. 3, exemplarily, three user roles are provided, and exemplarily only a moderator (another user role, third user role) may have the user's right to release content for publication (e.g. a chief editor or the like).

Exemplarily, in FIG. 3, the editor (second user role) on the editor level may then have the option to review submitted content, e.g. via their own preview application on their client 102. Exemplarily, the editor may have further options of rejecting the submitted content (e.g. to be then exemplarily received again by the author or another author user for further editing; the author being an exemplary first user role).

Further exemplarily, the editor may have options to edit submitted content, save edited content, delete reviewed content or release for publication, exemplarily not leading to direct publication in FIG. 3. The editor may also reject submitted content as discussed above.

Exemplarily, the moderator (third user role) may receive released content and may then review the released content or released new content version, and if acceptable for publication, the moderator may publish the released content or reject the content's publication otherwise. In further exemplary embodiments, the moderator may also have the rights to edit released content, save edited content, delete released content, etc. If released content is rejected by the moderator, the rejected content may be received again by the editor on the editor level (and/or it may directly be given back to the author level in other exemplary embodiments).

In the above, the shift of content between user levels, editing content, submitting content, releasing submitted content, rejecting submitted content, publishing released content and/or rejecting released content, and giving back rejected content to lower-hierarchy levels, may be supported by workflows provided by the workflow server 103.

In some exemplary embodiments, content may be stored with metadata which may include document models. A document model may describe how and/or where content of a document (object) is stored, and/or how the content relates to each other and/or to the document (or other documents, e.g. via links and/or references). The document model may be provided as an XML file in some exemplary embodiments.

In a general meaning, a document may refer to any content or combination of content. A document may also include references and/or links to other documents.

In a general meaning, a reference may indicate any referencing of a document or part thereof by another document, including pointing to another document, pointing to a portion or part of another document, citing or reciting another document, citing or reciting another document, etc. On the other hand, a link may be a user-selectable option referencing another document or part thereof, and allowing a user to access the referenced document or part thereof by selecting the user-selectable option.

Regarding the term "reference", it may be further considered that a document (e.g. at the technical level of persistent identifiable objects) may point at another document (e.g. at the same level) to indicate some sort of relationship between the document and the referenced document. For example, a page might reference an article as to be included in the rendered page, an article might reference a topic document to indicate that it relates to that topic, possibly showing a link to the topic when rendered, possibly being linked from a rendered topic page, etc.

In the example of a website, the website may include multiple webpages, which may be interlinked and/or referencing each other. For example, a main page may include multiple links and/or references to other webpages such as section webpages. Exemplarily, a newspaper webpage may link and/or reference to multiple topic category webpages, such as a politics webpage, a sports webpage, an economy webpage, etc., but the main page may also link and/or reference to article webpages directly, and the multiple topic category webpages may link and/or reference to the article webpages.

A webpage having an article may also link and/or reference to other articles on other article webpages, and/or the article webpage may link and/or reference back to the main webpage and/or the related topic category webpage. Furthermore, advertisement portions of a webpage may link to a group of advertisements (e.g. including images, video, text, etc.) and the specific advertisement to be shown to a user may be selected dynamically. Also article text bodies may include links and/or references to older articles relating to the same topic or subject-matter.

Furthermore, a main page or topic category webpage may reference only title and abstract of related articles. Such reference may mean that the documents are stored as objects (e.g. within objects), and a title of an article may be stored as a title object of an article object. Then, if another webpage such as a main page or the like references an object of an article object, such as a title object, abstract object or image object, the rendering of the main page would lead to obtaining the referenced title from the referenced title object.

In such document relations in which many documents link and/or reference to other documents or reference other documents' parts (such as title, abstract, images, thereof), documents are said to include dependencies on other documents. That is, editing a part of a certain document may affect other documents referencing the edited document, and documents referencing the documents referencing the edited document may also be affected as well in some scenarios.

Regarding the term "dependencies", it is remarked that a computation of a derived value (possibly a rendered document, possibly a rendered image, possibly a UI (user interface)state that needs a complex computation, possibly an internal representation of a complex hierarchy of categories, etc.) may access some part of the system state (e.g. including content, content objects, metadata objects, etc.), so that the outcome of the computation might change if that part of the system state changes. In this case, the computation can be said to depend on the part of the system state (e.g. a document's properties or the set of documents referencing another document).

For example, when a document is rendered, the referenced document(s) may, in some cases, be involved and/or included in the rendering, so that a reference can—but not necessarily does—imply a dependency for certain computations. Neither are all dependencies states of linked documents. For example, a rendered page might depend on a global configuration document that is not referred to from any document otherwise involved in the rendering.

In general a "dependency" may indicate one or more documents that is involved or included in a computation, e.g. a validation computation and/or index computation, executed in the content management system. That is, the phrase "a certain computation depends on a certain set of documents" may indicate that the documents of the certain set of documents are involved or included in the certain computation, i.e. when executing the certain computation, the documents or the set of documents or parts thereof are checked, retrieved and/or in any other way involved in the computation. In other words, a dependency is a mapping relationship that relates (associates) a computation (data processing operation) with documents and/or objects involved in the computation, e.g. due to references.

Furthermore, the phrase that a certain document is said to include dependencies on other documents may indicate that at least one computation (data processing operation), e.g. for validating the certain document, may include and/or involve other documents when executing the computation, for example, because the certain document references and/or links to the other documents.

Further examples, exemplary details and exemplary explanations will be provided in the following.

In exemplary embodiments, the content is stored as objects. Objects may relate to data content and/or metadata. That is metadata and/or configuration data can be stored as objects, as well. In general, an object includes one or more properties, and each property may include metadata, content data, values or other type of data, or a property can be empty. Documents include and/or reference one or more objects and/or other documents, in accordance with an associated document model. For example, for an article, properties of the article object may include creation date, version number, author, title, subtitle, summary (abstract), article body, references to other articles, webpages, objects or other object's properties (such as titles of other articles), etc.

For example, if an article is stored as an article object referencing to an empty abstract property of the article object, then this not only affects the article object or the rendered article of the article object due to missing abstract content, but it may further affect some or all other documents and/or objects, such as webpages, referencing the article object or the article's abstract property.

For avoiding effects due to such document dependencies, exemplary embodiments provide the validation application 40 on clients 102 (see FIG. 2). The validation application 40 may be configured to indicate warnings to a user of the respective client 102 when editing or opening documents within the editing application 20. The warnings may indicate one or more issues with a document or with documents referenced by the document, etc.

For determining whether a document has a certain issue, in order to be able to indicate a warning to the user, the document (and potentially other referenced documents) is to be checked by a given associated validation algorithm.

As previously discussed, issues may involve checks (validation) of single content objects. Examples for such issues may include: checking whether a property (e.g. a title) is empty, checking whether a property meets a given criteria (e.g. property must not exceed a given threshold), checking whether at least a given number and/or type(s) of properties is set (e.g. a subtitle and/or a summary), checking whether an included URL does point to a valid webpage, and/or checking whether any list of links contains duplicate entries, etc.

Other issues may involve checking multiple objects and/or documents. Examples for such issues may include: checking whether a property (e.g. title, subtitle, summary) adheres to limits or requirements, e.g. as specified in a central configuration object (e.g. a minimum length, etc.), checking whether content objects are involved in inadmissible referencing cycles (e.g. in a navigation hierarchy: e.g. Main/Sports/Football/Champions League, wherein the latter section may include a cycle reference to the Main section, but not to Sports and Football sections), checking whether a property is to be set locally or not, e.g. if and only if it is not forced in the surrounding (e.g. a list of footer entries may often be forced to be uniform in an entire website or website section, but may have to be set explicitly at other times when the parent section does not provide information), checking whether a content object is obtained/derived from another object by translation (then it may need to be updated with the last version of the source language content object, e.g. by storing a version number of the translated content locally, so that a validator can check it against a current version number), checking whether a content object references and/or links to an archived object (this may change when links change or when a linked document is archived or unarchived), and/or checking whether a content object links to an object of other websites not held in the same content repository.

In preferred exemplary embodiments, the actual calculation/validation of criteria (checking issues, e.g. as above) to determine whether there are any issues with a certain document or group of documents is executed on a server such as e.g. on the workflow server 103 or the content server 101 or another dedicated server communicably connected to the content database 104. This has the benefit of improved bandwidth, e.g. since such computations may involve many objects accessible by the content server 101. Furthermore, since such computations may involve APIs granting different privileges, it may be more secure to run such computations on the content server 101 rather than on a browser environment on a client. Furthermore, this may provide improved secrecy since used algorithms may not be public but may be kept within the secured content server 101. In some exemplary embodiments, another reason may also be a programming language, e.g. when a validation algorithm is programmed in a language, e.g. Java, when the client does not run the respective language.

In preferred exemplary embodiments, the content server includes multiple programmable validators applicable to one or more content objects and/or to one or more documents or document's objects. A validator may be a programmed algorithm executing one or more validation operations (checking operations) on the respective one or more content objects and/or to one or more documents or document's objects, depending on the programmed algorithm.

Other computations that may be executed at the content server 101 to be cached to clients 102, may include: computing a set of websites served by a content repository (the CMS might hide entire sites based on specific conditions, e.g. manually disabled, no rights for current user, improperly configured and only visible to administrators for fixing), and/or finding all content objects that are translated from a given document (possible limiting to documents that need an update), listing languages into which a content object has not been translated, etc.

Figure 4:
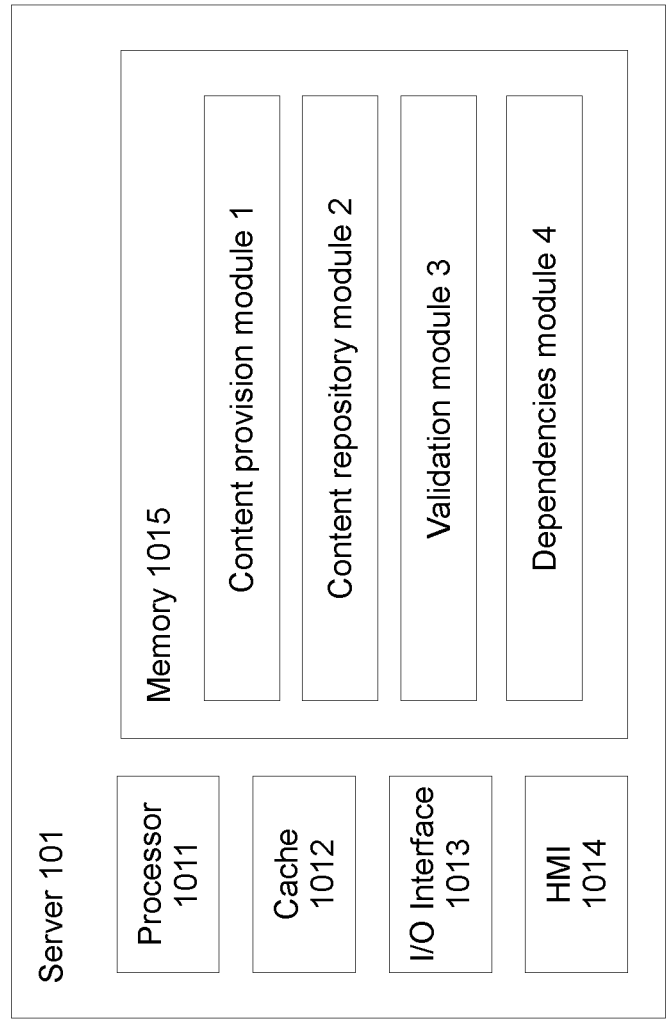
FIG. 4 exemplarily illustrates a schematic view of the content server 101 in accordance with some exemplary embodiments.

FIG. 4 exemplarily illustrates a schematic view of the content server 101 (such as content management server 101 in FIG. 1) in accordance with some exemplary embodiments.

The content server 101 exemplarily includes a processor 1011 for data processing, a cache memory 1012 for temporarily storing cache values (such as data content, including text, images, video, metadata, settings values, strings, numbers, flags, validation results, etc.), an I/O interface (e.g. network interface) 1013 for connection to the repository 104 and/or the clients 102, e.g. via a network such as network 105 in FIG. 1, and an HMI (Human-Machine-Interface) 1014 for user input/output, including any one of a display or touch-display, a keyboard, a mouse, a touch pad, a trackball, a headset, a microphone, a speaker, etc. Alternatively, the HMI 1014 may be connected of be connectable to a management computer for access by a system administrator or other person allowed to program algorithms of validators. Other ways of accessing the system for adjusting settings or custom code by administrators, e.g. via network access, web access, etc. are possible, too.

The content server 101 further exemplarily includes a memory 1015 (including any of a ROM, RAM, NVRAM, disk drive(s), flash drive(s), or other type of accessible storage, etc.) for storing application data for applications to be executed by processor 1011 and/or by other applications being executed by processor 1011.

Exemplarily, the applications on the content server 101 may include a content provision module 1 for providing requested content to the clients 102, a content repository module 2 for managing content on the repository 104, a validation module 3 including multiple executable validators (programmed or programmable validation operation algorithms) and a dependencies module 4 for managing dependencies (explained in more detail below).

In general, when a document edited by a user on a client is not accepted by one or more validators (validation algorithms), then the user is indicated a warning that there are one or more issues. As previously mentioned, the validators are executed by the validation module 3 on the content server 101 in preferred exemplary embodiments.

That is, whenever a document or content thereof is edited by the user, the document may need to be checked again by associated validators. On the other hand, since a document may reference other documents which may have been changed in the meantime by another user on another client 102, or the document may include other objects than the object edited by the user, and such other objects may have been changed by other users on other clients, it may occur that a recent validation result may be outdated, even though the user did not make any changes to the document since the last requested validation computation.

From the view point of the client 102, it is therefore not easily derivable which validation computations may need to be repeated or be updated at certain times, due to such dependencies of the validation.

Furthermore, it is possible that a certain validation operation (validation computation; data processing operation), which the last time it was computed was depending on certain other documents or objects, may now depend on further documents or objects (e.g. if one of the previously dependent documents has gained a link and/or reference to yet a further document or object in the meantime, or the like, and/or if the validation algorithm has been reprogrammed and now affects further documents or objects).

Still, it is not desirable to continuously request new computation/execution of all validation computations at the server from all clients, as this would significantly affect bandwidth and computational workload on the server side.

In some exemplary embodiments, validation results are preferably temporarily stored in the cache memories 1022 of the clients 102. That is, whenever a client 102 requests execution of a certain validation computation or requests validation of a certain document at the server 101, so that the server 101 computes the requested certain validation computation or all validation computations/operations relating to the certain document, the validation result(s) is(are) stored in the respective requesting client's cache 1022 upon being returned from the server 101.

In other words, the clients 102 do not necessarily have the complete knowledge about the full current state of content managed by the content server 101 and the related current validation results, but the clients 102 have recent validation results relating to currently edited or opened documents in cache memory.

In preferred exemplary embodiments, the clients 102 manage dependencies of validation computations/operations executed on the server 101. Furthermore, clients 102 are preferably informed by the server 101 on changes of content so as to be able to detect necessity of re-computation of one or more validation operations at the client side, preferably maintaining a stateless server.

Figure 5:
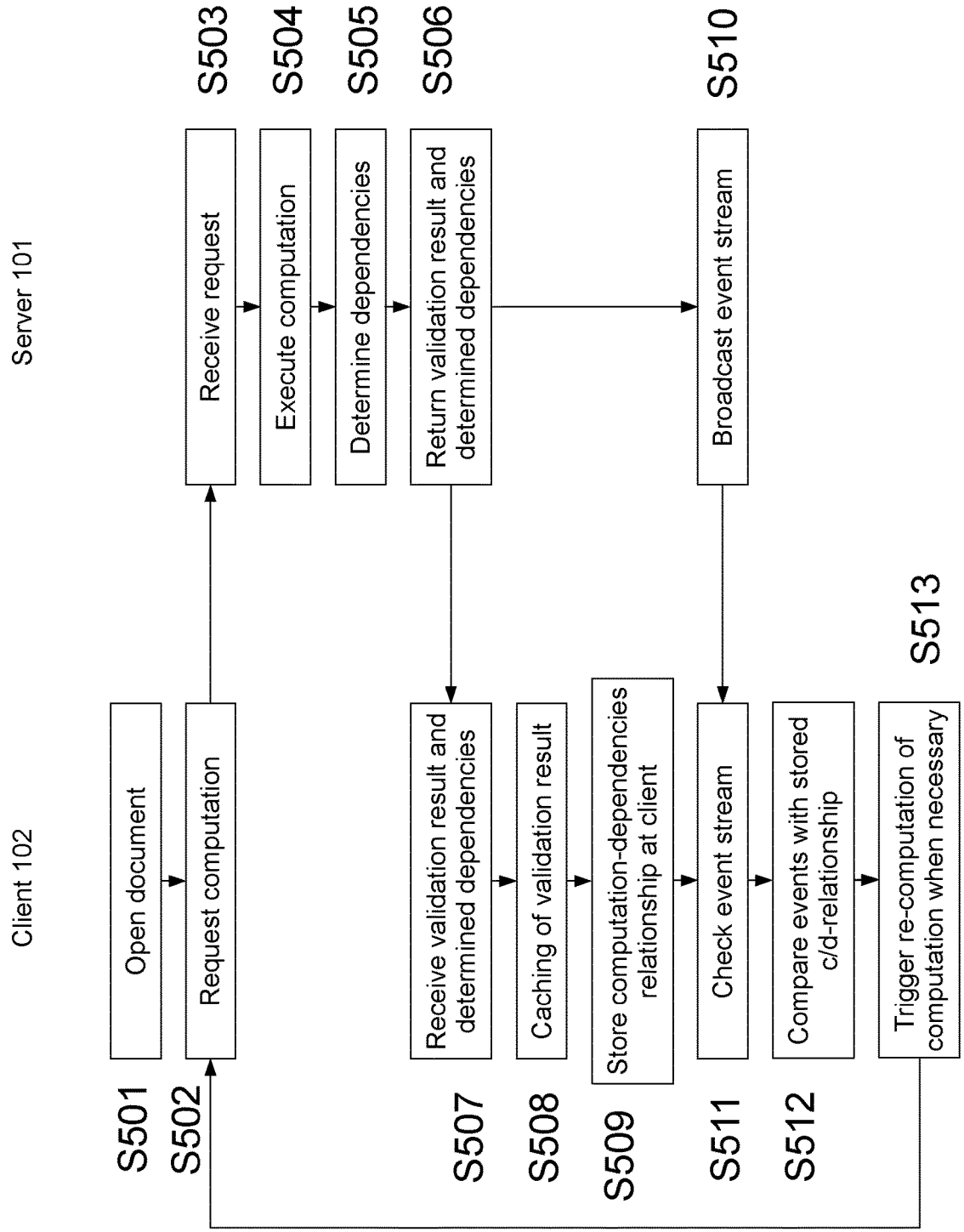
FIG. 5 exemplarily illustrates a flow chart of a method of managing data in a content management system in accordance with some exemplary embodiments.

FIG. 5 exemplarily illustrates a flow chart of a method of managing data in a content management system in accordance with some exemplary embodiments.

Exemplarily, the steps on the left-hand side are executed by a client 102 (or each of the clients 102) and the steps on the right-hand side are executed by the content server 101.

Exemplarily, in S501 a user opens a document on an editing application on the client 102, and (e.g. when opened or when necessary due to an editing change of the user) in S502 the client 102 requests a validation operation on the document or an object thereof.

In S503 the server 101 receives the validation request and executes the validation computation in S504 based on the current state of the content (known to the server 101 at that time), i.e. of the state of content managed by the server 101 on repository 104. This may include one or more validators at the server 101.

In S505 (which may occur at the same time or in parallel with S504), the server 101 detects and/or determines which documents and/or content objects are involved in the requested validation operation. That is, the server 101 determines the dependencies of the validation computation at the time of computation in S504.

In S506 the server 101 returns the validation result of the requested validation operation to the requesting client 102 together with the indication of the determined dependencies, and the client 102 receives the validation result of the requested validation operation together with the indication of the determined dependencies from the server 101 in S507.

In S508, the client 102 stores the received validation result in its cache memory 1022 and further stores the received dependencies as a relation between validation computations and its associated dependencies. In other words, the client 102 stores a relationship associating each previously requested validation computation with documents and/or content objects affecting or being involved with the validation computation.

In some exemplary aspects, the above, specifically S504 and S505 may be referred to as "dependency tracking". Specifically, dependency tracking may refer to a process when reading a content object (or a part thereof) during a validation computation also records the content object (or an aspect thereof) as a dependency of the validation computation.

The relationship(s) (dependencies) may be stored in a database, a main memory and/or in a cache memory at the client 102.

Furthermore, the server 101 broadcasts an event stream to the connected clients 102, indicating events of the content management system. Such indicated events may include one or more of: changes of content objects (which may include changes of properties of content objects), changes of a reference count and/or a link count of content objects and/or documents (such as gaining or losing incoming and/or outgoing links and/or references), changes of workflow process states and/or workflow process task states, changes of user objects and/or changes of group objects (which may indicate user or group authorizations, e.g. when validation computations may depend on identity, level and/or authorization of a requesting user).

That is, in S510 the server 101 broadcasts the event stream to the connected clients 102, and the client 102 receives and checks the event stream in S511. In S512 the client 102 compares events indicated in the received event stream with the stored relation between validation computations and its associated dependencies.

Specifically, if one of the events of the received event stream affects a validation computation and/or concerns a document or object of the dependencies of a certain validation computation, the client 102 may flag the corresponding validation result as invalid and re-computation of the respective validation result may be necessary before use.

In some exemplary embodiments, the client 102 may immediately request re-computation of the respective validation computation(s) affected by incoming event indications of the event stream. That is, S513 of triggering re-computing the validation computation by another S502 request may occur upon detecting invalidation of a cached validation result. However, this may still result in higher bandwidth and computational burden at the server.

Therefore, in more preferred exemplary embodiments, the client 102 may initially just flag the corresponding certain validation result as invalid in the cache memory, when one of the events of the received event stream affects the certain validation computation and/or concerns a document or object of the dependencies of the certain validation computation. Then, preferably only when the validation result is actually needed again, e.g. upon another editing operation by the user within the currently opened document at the client 102 and/or upon opening another document requiring the same validation computation, the client 102 may trigger re-computation of the required validation result by another S502 request, when necessary.

It is to be noted that the stored relationship of computations and associated dependencies (S509) is preferably done whenever a new computation is requested and respective results and associated dependencies are received from server 101, and the stored relationship is preferably extended and/or updated whenever such new results are obtained at the client 102.

Figure 6:
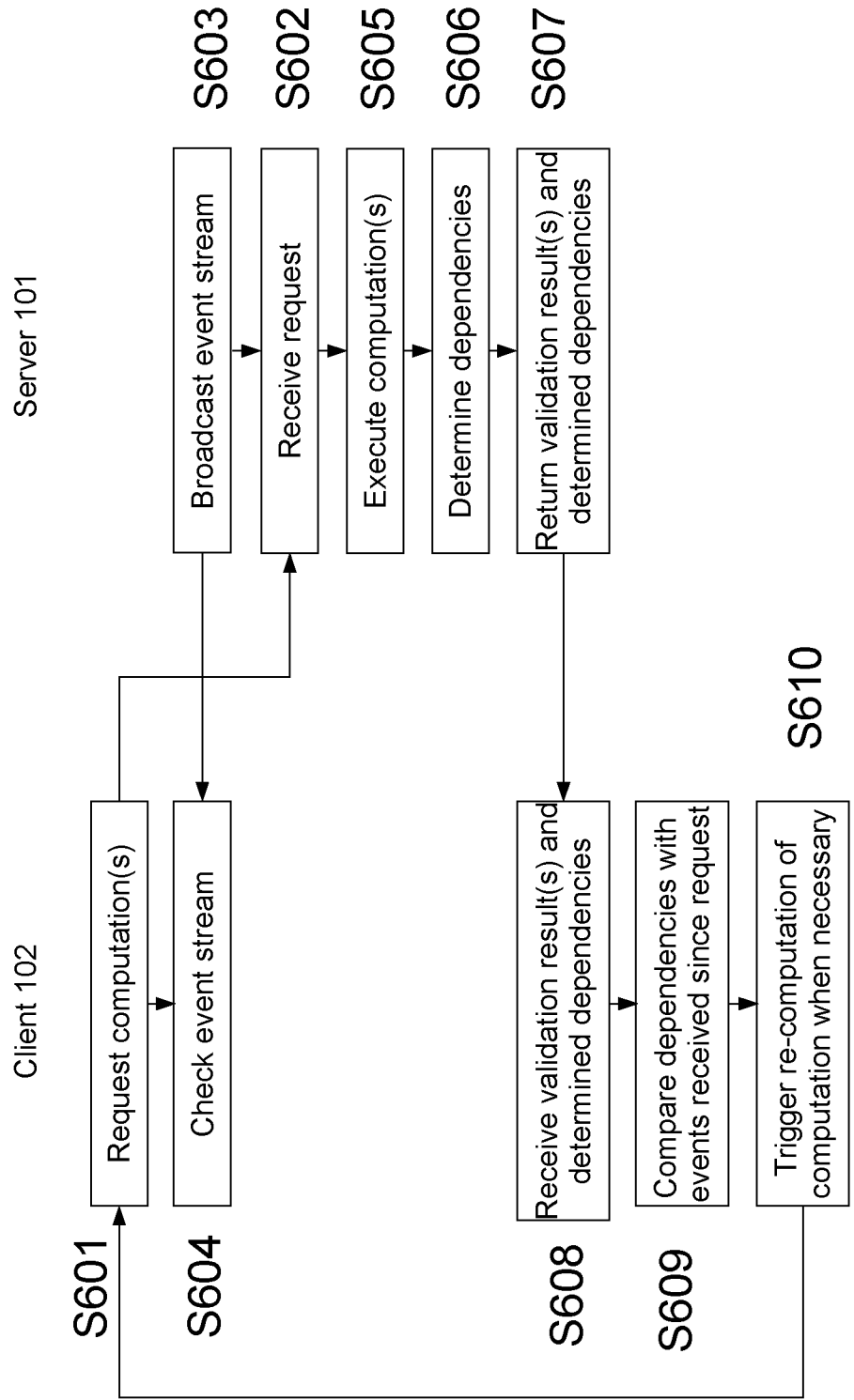
FIG. 6 exemplarily illustrates a flow chart of a method of managing data in a content management system in accordance with some exemplary embodiments.

FIG. 6 exemplarily illustrates a flow chart of a method of managing data in a content management system in accordance with some exemplary embodiments. It is to be noted that the method of FIG. 6 may be regarded as an extension of the method of FIG. 5, rather than an alternative, in some exemplary embodiments.

This involves the exemplary (optional) additional listening to the event broadcast between requesting a validation computation and receiving the results.

Exemplarily, the steps on the left-hand side are executed by a client 102 (or each of the clients 102) and the steps on the right-hand side are executed by the content server 101.

In S601 the client requests a validation computation (e.g. similar to S502) and then listens to the event stream (S604) broadcast from the server 101 (S603). This is similar to S510 and S511, however, preferably the client 102 remembers the time and/or position within the event stream at the time of the request and monitors the events indicated after the request.

The server 101 handles S602, S605, S606, and S607 similar to S503 to S506 above, and the client 102 receives the validation result of the requested validation operation together with the indication of the determined dependencies from the server 101 in S608.

In S609, the client 102 may store the received validation result in its cache memory 1022, if valid, and further stores the received dependencies as a relation between validation computations and its associated dependencies, similar as in FIG. 5.

However, exemplarily, the client 102 executes another check in S609 of comparing the received dependencies for the requested validation computation with events received in the event stream since the time of the request in S601, and if an event relates to a document or object included in the dependencies of the validation computation, the validation result received in S608 may be determined to be invalid, and re-computation may be triggered based on occurrence of events since previously requesting the validation computation.

It is to be noted that the tracking of events between a time of the request and receipt of results at the client 102 may be based on an internal clock of the client. It may also be based on an internal clock of the server 101, and the server then preferably indicates a time of receipt of the request (or time of computation thereof) when returning the results. Further, in order to improve synchronicity, the events in the event stream may also indicate time based on the internal server clock. This allows that the client determines events occurring after the server clock time at receipt of the request (or computation thereof).

In other exemplary embodiments, tracking of events may also include a logical clock in which occurring events are counted by increasing integers, and the server may indicate a logical event stream time at the time of receipt of the request or computations thereof, so that the client can determine which events occurred thereafter in logical event stream time (such as e.g. an integer event count).

Figure 7:
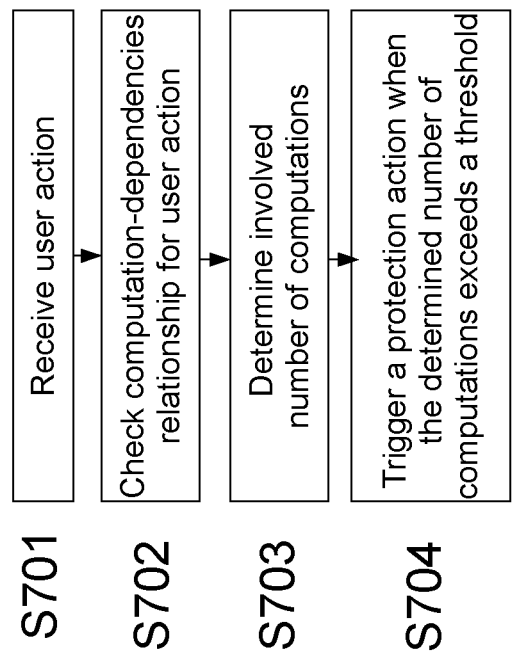
FIG. 7 exemplarily illustrates a flow chart of a method of managing data in a content management system in accordance with some exemplary embodiments.

FIG. 7 exemplarily illustrates a flow chart of a method of managing data in a content management system in accordance with some exemplary embodiments.

In FIG. 7 it is exemplarily assumed that the clients 102 store a relationship of computation and their dependencies according to one or more of the above exemplary aspects.

It is exemplarily assumed that some changes may lead to significant numbers of validation and/or indexing computations.

For normal distributed dependency tracking applications, usually there should not be thousands or tens of thousands of validation computations, because most clients are only interested in a small subset of content objects at a single time. On the other hand, in connection with indexing applications (e.g. feeder applications), which concern themselves with a high number of or all content objects at the same time, this may involve such significant numbers of validation computations.

For example, in content management system, indexing applications may generate, e.g. in an automated background process, indexes of content (e.g. object search indices, text search indices, etc.). Such generated index may involve many (sometimes hundreds or thousands) documents, e.g. in connection with embedded text modules, references of links, in the index entries. In general, index computations and their dependencies can be handled similar to validation computations and their dependencies as discussed herein.

Accordingly, it is conceivable that a modification in an object, such as in a content object of a document, may result in the necessity to re-compute a large number of index entries. In such scenarios, exemplary embodiments may beneficially use the above-described dependency tracking, that is the determined (optionally bi-directional mapping) relationship between computations and documents/objects on which the respective computations do depend. Then, users should preferably be warned that the modification may result in re-computation of many values and/or index entries (i.e. involving a significant number of data processing operations/computations) at high processing burden. Also, further security measures may be implemented in some exemplary embodiments, e.g. checking user level authorization and/or requesting approval by a higher authorized user before executing the modification that would lead to the high number of computations or re-computations.

Regarding a normal distributed dependency tracking applications, a high number of computations and/or re-computations may be triggered, for example, if a user, e.g. on an editing application on a client 102, attempts to change a configuration object having setting affecting thousands or more of other objects and/or documents, or other central objects having central settings or central metadata relevant to the whole system or large parts of its complete content (e.g. also a change of an object being referenced by a large portion of all webpages of an entire website (such as a header layout defining object or the like), then this change may trigger thousands or ten-thousands of validation operation executions, which may put undesired computational burden on the server 101.

Then, users should preferably be warned that the modification may result in re-computation of many values (i.e. involving a significant number of data processing operations/computations) at high processing burden. Also, further security measures may be implemented in some exemplary embodiments, e.g. checking user level authorization and/or requesting approval by a higher authorized user before executing the modification that would lead to the high number of computations or re-computations.

In this connection, it is preferred in some exemplary embodiments that the editing applications communicate with the validation applications on clients 102 and/or with the indexing applications on clients and/or the server(s), when the user attempts to edit a document or object. Specifically, when a user attempts to open, edit, change, save, and/or change a state of a document (such as release and/or publish the document), the indexing/validation application may check the required validation computations and/or indexing computations and the associated dependencies of those computations from the stored computations-objects-dependencies relationship, and when the number of associated dependencies (e.g. the number of affected objects and/or documents) and/or the number of required computations exceeds a pre-set (or administrator settable) threshold, a protection measure is executed.

Such protection measure (protection action) may include any one of issuing a warning to the user that the intended user action will trigger a high computational burden on the server and trigger a storm of validation and/or indexing computations, when the user confirms to proceed with the attempted user action.

Also, in addition or alternatively, the validation application and/or indexing application may verify whether the user role of the user or the user identity is associated with a sufficiently high authorization level to effect such high computational burden, and reject the user action when the verification fails, as a protection action.

Also, in addition or alternatively, the validation application and/or indexing application may verify whether the current date and/or time is suitable for such high computational burden, and reject the user action when the user action is attempted outside an allowed time period or date window (e.g. when high computational burden on the server is only admitted at certain times, e.g. at night time, or dates, e.g. on weekends), as a protection action.

In view of the above, the method of FIG. 7 exemplarily includes S701 in which a user action is received, such as e.g. opening or editing a document, or changing an object or object-property of an opened document, or changing a setting in a configuration object, or other user actions which may potentially trigger at least one computation.

In S702 the client 102 checks the stored computation-dependencies relationship for the received user action, and determines the involved computations and related computational burden in S703. This may be indicated by a number of computations or, in other exemplary embodiments, by an accumulated validation processing burden adding respective processing burden indicators per determined computation.

When the determined computational burden, as exemplarily indicated by a number of computations involved, exceeds a threshold, such as a given preset threshold or an administrator-configured threshold, then a protection action is triggered to either warn the user, such as by a warning message and/or warning sound, and/or to reject the user action requested by the user to avoid the (re-)computation of associated computations.

Summarizing, it is to be noted that the above exemplary aspects of cache value invalidation and/or indexing make use of the stored computations-dependencies relationship in different directions. In some exemplary aspects above, the validity of a validation result in cache is determined based on documents and/or objects associated with the validation computation for determining the validation result, to detect when a validation computation has to be re-computed based on a change of one of the documents/objects on which the validation computation depends. This requires exemplarily the mapping relationship which maps validation computation to their respective dependent objects and/or documents (e.g. indicating objects and/or documents involved in computation of a respective validation).

On the other hand, by the above exemplary aspect to avoid storm-like computational burden when changing a document or object which involves a huge number of computations, the document or object to be changed is known and the stored relationship is used to determine the associated validations and/or index computations. This requires exemplarily the mapping relationship which maps objects and/or documents to the validation and/or indexing computations involved when the object and/or document changes.

Accordingly, exemplary embodiments preferably utilize a relational bi-directional mapping between objects/documents and the dependencies-associated validation/indexing computations, as such cache content can be used in many beneficial ways in content management systems.

As will be appreciated by one of skill in the art, the present invention and exemplary embodiments, as described hereinabove and the accompanying figures, may exemplarily be embodied as a method (e.g., a computer-implemented process or any other process), apparatus (including a device, machine, system, computer, server, server system, client-server system, computer program product, and/or any other apparatus), or a combination of the foregoing.

Accordingly, some exemplary embodiments of the present invention may take the form of an entirely hardware embodiment, an entirely software embodiment (including firmware, resident software, micro-code, etc.), or an embodiment combining software and hardware aspects that may generally be referred to herein as a "system" Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Some exemplary embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, Java, or HTML) for use with various operating systems or operating environments. The source code may define and use various data structures and communication messages. The source code may be in a computer executable form (e.g., via an interpreter), or the source code maybe converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different embodiments of the invention described herein may be combined to form other embodiments of the invention.

The invention claimed is:

1. A method for data management in a content management system comprising at least one server and one or more clients communicably connectable to the server, the server being configured to manage a plurality of mutable data objects and to enable the one or more clients to access data objects managed by the server, the method comprising:
receiving, by a first client of the one or more clients, first-type information indicative of result data of at least one data processing operation, including validation computation and/or indexing computation based on the current status of the data objects, the dependencies of the validation computation at the time of computation, and a respective associated set of data objects,
storing, by the first client, result data of the at least one data processing operation and received dependencies as a relation between validation computation and its associated dependencies in a memory,
receiving, by the first client, second-type information indicative of modification of at least one of the data objects, and
determining, at the first client and before using the result data of the at least one data processing operation stored in the memory, whether the respective result data is valid or not based on the first-type information and the second-type information.

2. The method of claim 1 wherein:
each of the at least one of a plurality of data processing operations, including validation computations and/or indexing computations, is associated with a respective set of the plurality of data objects and the respective result data being outputted by the respective data processing operation is indicative of a status of the respective set of data objects or a data object thereof; and/or
the method includes executing, by the server, at least one of a plurality of data processing operations, including validation computations and/or indexing computations, each data processing operation being associated with a respective set of the plurality of data objects and each data processing operation outputs respective result data indicative of a status of the respective set of data objects or a data object thereof.

3. The method of claim 1 wherein:
determining whether the respective result data is valid includes determining whether the second-type information indicates that at least one of the data objects included in the set of data objects associated with the respective data processing operation as indicated in the first-type information was modified.

4. The method of claim 1, further comprising:
requesting, by the first client, the server to re-execute at least one data processing operation if the associated result data, including result data stored in the memory at the first client, is determined to not be valid by the first client.

5. The method of claim 1, further comprising:
transmitting, by the server, and/or receiving, by the first client, first-type information indicative of updated result data of the at least one re-executed data processing operation and/or updated information on the respective associated set of data objects, and
determining, by the first client, whether the updated result data is valid or not based on a determination whether second-type information, which was received since the request to re-execute the at least one data processing operation, indicates that at least one of the data objects included in the set of data objects associated with the respective data processing operation was modified.

6. The method of claim 1 wherein:
at least one of the sets of data objects includes a single data object, and/or at least one of the sets of data objects includes plural data objects, including plural objects that are related to one or more documents.

7. The method of claim 1, further comprising:
receiving, by the first client from the server, second-type information as a stream of events of objects modifications in the system; and/or
transmitting, by the server to the first client or to all of the one or more clients, second-type information as a stream of events of objects modifications in the system.

8. The method of claim 1 wherein:
executing, by the server, the at least one of the data processing operations is performed including:
determining, by the server, upon or while executing the respective data processing operation, the data objects being used as input information for executing the respective data processing operation, and
generating, by the server, the first-type information indicative of the result data of the respective data processing operation and the respective associated set of data objects including the data objects being used as input information for executing the respective data processing operation.

9. The method of claim 1 wherein:
executing, by the server, the at least one of a plurality of data processing operations comprises determining, for each of the at least one of a plurality of data processing operations, a graphical representation to be displayed by the first client, the graphical representation being indicative of the current state of one or more data objects.

10. The method of claim 1 wherein:
executing, by the server, the at least one of a plurality of data processing operations comprises determining, for each of the at least one of a plurality of data processing operations, whether the respective set of data objects complies with one or more criteria, and
wherein the status of the respective set of data objects indicated in the respective result data is indicative of whether the respective set of data objects complies with the respective one or more criteria.

11. The method of claim 1 wherein:
respective result data of at least one of the data processing operations is different for different clients requesting the execution of the respective data processing operation; or
respective result data of at least one of the data processing operations is independent on which client requested the execution of the respective data processing operation.

12. The method of claim 1, further comprising:
determining, by the server, upon a request for second-type information, time information that comprises time stamps, digital timestamps, clock time and/or logical timestamps identifying the state of the plurality of data objects,
requesting, by the first client, additional second-type information based on time information received with second-type received during another request, in particular another earlier and/or independent request, and
determining, by the server, second-type information comprising the set of data object modifications since said other request.

13. A method for data management in a content management system comprising at least one server and one or more clients communicably connectable to the server, the server being configured to manage a plurality of mutable data objects and to enable the one or more clients to access data objects managed by the server, the method comprising:
executing, by the server, at least one of a plurality of data processing operations, including validation computations and/or indexing computations, each data processing operation being associated with a respective set of the plurality of data objects and each data processing operation outputs respective result data indicative of a status of the respective set of data objects or a data object thereof;
determining, by the server, the dependencies of the validation computation at the time of computation;
transmitting, by the server to a first client of the one or more clients, first-type information indicative of result data of at least one data processing operation, including validation computation and/or indexing computation based on the current status of the data objects, the determined dependencies of the validation computation, and a respective associated set of data objects, and
transmitting, by the server to the first client or to all of the one or more clients, second-type information indicative of modification of at least one of the data objects for determining whether the respective result data is valid or not based on the first-type information and the second-type information.

14. The method of claim 13, further comprising:
requesting, by the first client, the server to re-execute at least one data processing operation if the associated result data, including result data stored in the memory at the first client, is determined to not be valid by the first client.

15. The method of claim 13, further comprising:
transmitting, by the server, and/or receiving, by the first client, first-type information indicative of updated result data of the at least one re-executed data processing operation and/or updated information on the respective associated set of data objects, and
determining, by the first client, whether the updated result data is valid or not based on a determination whether second-type information, which was received since the request to re-execute the at least one data processing operation, indicates that at least one of the data objects included in the set of data objects associated with the respective data processing operation was modified.

16. The method of claim 13 wherein:
at least one of the sets of data objects includes a single data object, and/or at least one of the sets of data objects includes plural data objects, including plural objects that are related to one or more documents.

17. The method of claim 13, further comprising:
receiving, by the first client from the server, second-type information as a stream of events of objects modifications in the system; and/or
transmitting, by the server to the first client or to all of the one or more clients, second-type information as a stream of events of objects modifications in the system.

18. The method of claim 13 wherein:
executing, by the server, the at least one of the data processing operations is performed including:
determining, by the server, upon or while executing the respective data processing operation, the data objects being used as input information for executing the respective data processing operation, and
generating, by the server, the first-type information indicative of the result data of the respective data processing operation and the respective associated set of data objects including the data objects being used as input information for executing the respective data processing operation.

19. The method of claim 13 wherein:
executing, by the server, the at least one of a plurality of data processing operations comprises determining, for each of the at least one of a plurality of data processing operations, a graphical representation to be displayed by the first client, the graphical representation being indicative of the current state of one or more data objects.

20. The method of claim 13 wherein:
executing, by the server, the at least one of a plurality of data processing operations comprises determining, for each of the at least one of a plurality of data processing operations, whether the respective set of data objects complies with one or more criteria, and
wherein the status of the respective set of data objects indicated in the respective result data is indicative of whether the respective set of data objects complies with the respective one or more criteria.

21. The method of claim 13 wherein:
respective result data of at least one of the data processing operations is different for different clients requesting the execution of the respective data processing operation; or
respective result data of at least one of the data processing operations is independent on which client requested the execution of the respective data processing operation.

22. The method of claim 13, further comprising:
determining, by the server, upon a request for second-type information, time information that comprises time stamps, digital timestamps, clock time and/or logical timestamps identifying the state of the plurality of data objects,
requesting, by the first client, additional second-type information based on time information received with second-type received during another request, in particular another earlier and/or independent request, and
determining, by the server, second-type information comprising the set of data object modifications since said other request.

23. A system comprising at least one server and one or more clients communicably connectable to the server; the system being configured to execute a method comprising:
receiving, by a first client of the one or more clients, first-type information indicative of result data of at least one data processing operation, including validation computation and/or indexing computation based on the current status of the data objects, the dependencies of the validation computation at the time of computation, and a respective associated set of data objects;
storing, by the first client, result data of the at least one data processing operation and received dependencies as a relation between validation computations and its associated dependencies in a memory;
receiving, by the first client, second-type information indicative of modification of at least one of the data objects; and
determining, at the first client and before using the result data of the at least one data processing operation stored in the memory, whether the respective result data is valid or not based on the first-type information and the second-type information;
wherein the server is configured to manage a plurality of data objects and to enable the one or more clients to modify data objects managed by the server, to execute at least one of a plurality of data processing operations, each data processing operation being associated with a respective set of the plurality of data objects and each data processing operation outputs respective result data indicative of a status of the respective set of data objects, and to determine the dependencies of the validation computation at the time of computation;
wherein each client of the one or more clients is configured to receive first-type information indicative of the result data of the at least one data processing operation, the dependencies of the validation computation at the time of computation, and the respective associated set of data objects, and a second-type information indicative of modification of at least one of the data objects by one of the one or more clients, to store result data of the at least one data processing operation and received dependencies as a relation between validation computations and its associated dependencies in a memory of the respective client, and to determine before using the result data of the at least one data processing operation stored in the memory, whether the respective result data is valid or not based on the first-type and second-type information.

24. A computer program product for one or more clients communicably connectable to a server, the computer program product comprising a non-transitory computer usable medium having computer readable program code embodied therein, said computer readable program code adapted to be executed to implement a method comprising:
receiving, by a first client of the one or more clients, first-type information indicative of result data of at least one data processing operation, including validation computation and/or indexing computation based on the current status of the data objects, the dependencies of the validation computation at the time of computation, and a respective associated set of data objects,
storing, by the first client, result data of the at least one data processing operation and received dependencies as a relation between validation computations and its associated dependencies in a memory,
receiving, by the first client, second-type information indicative of modification of at least one of the data objects, and
determining, at the first client and before using the result data of the at least one data processing operation stored in the memory, whether the respective result data is valid or not based on the first-type information and the second-type information.

\* \* \* \* \*